United States Patent

Wolf et al.

[15] 3,668,625

[45] June 6, 1972

[54] MONITORING SYSTEM

[72] Inventors: David Wolf, 67 Bracket Road, Newton, Mass. 02158; Edward Blank, 550 Turnpike St., Sharon, Mass. 02021

[22] Filed: Sept. 21, 1970

[21] Appl. No.: 73,974

[52] U.S. Cl. ..............................340/38 R, 324/52, 340/23, 340/31 R
[51] Int. Cl. .........................................................G08g 1/01
[58] Field of Search ............340/31 R, 38 R, 38 L, 23, 258 R, 340/258 C, 282; 324/52

[56] References Cited

UNITED STATES PATENTS

| | | | |
|---|---|---|---|
| 3,031,643 | 4/1962 | Sheftelman | 324/52 |
| 3,508,238 | 4/1970 | Baker | 340/38 L |
| 3,477,019 | 11/1969 | Hartman | 324/52 |
| 3,440,600 | 4/1969 | Frech et al. | 340/31 R |
| 3,434,049 | 3/1969 | Frye | 324/52 |

*Primary Examiner*—Kathleen H. Claffy
*Assistant Examiner*—Randall P. Myers
*Attorney*—Wolf, Greenfield, Hieken and Sacks

[57] ABSTRACT

A monitoring device designed primarily for monitoring movement of automotive vehicles on highways, tunnels, bridges and the like. Cables extend the length of the highway or other route being monitored which are designed to have their characteristic impedance varied by movement of vehicles in adjacent parallel paths. The cables are connected to a pulsing circuit and receiver so that the cables may be pulsed and reflections or partial reflections of the pulsed signals received and displayed on an oscilloscope which is calibrated for an A scope visual display and indication of the highway or route being monitored. The presence of automobiles or the like along the highway cause impedance mismatches on the cables which are reflected and suitably displayed. These impedance mismatches move along the display at a rate consistent with the rate of movement of the vehicles and thereby indicate visually movement or stoppage of traffic. The system is designed to be connected automatically to traffic control signals.

7 Claims, 6 Drawing Figures

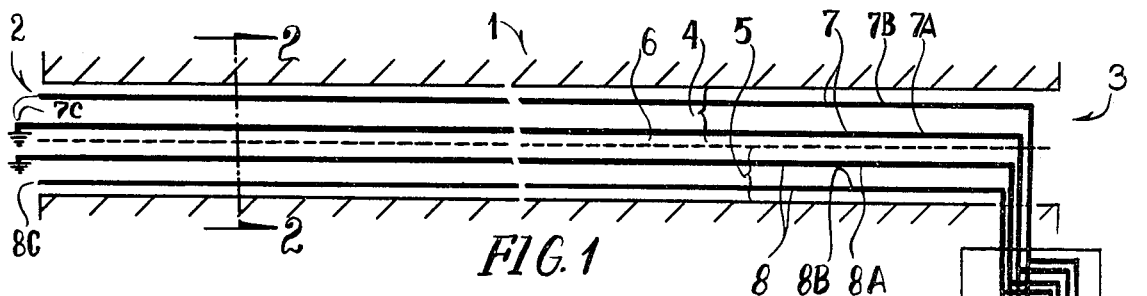
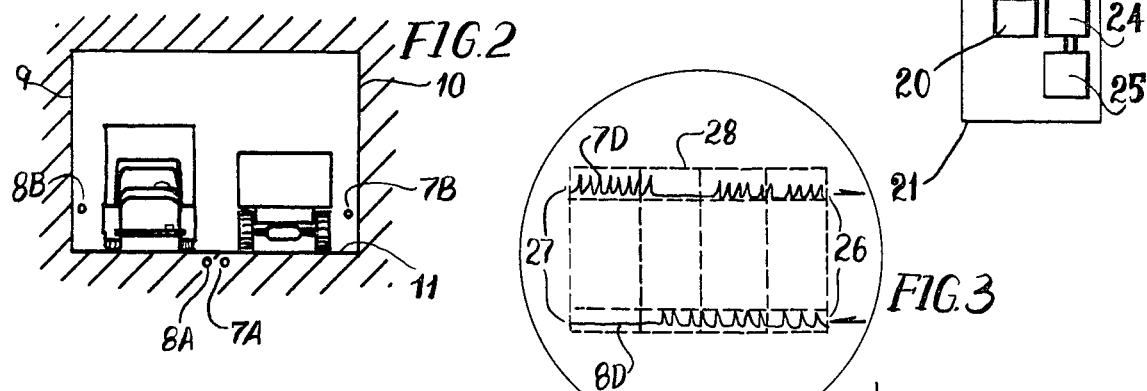
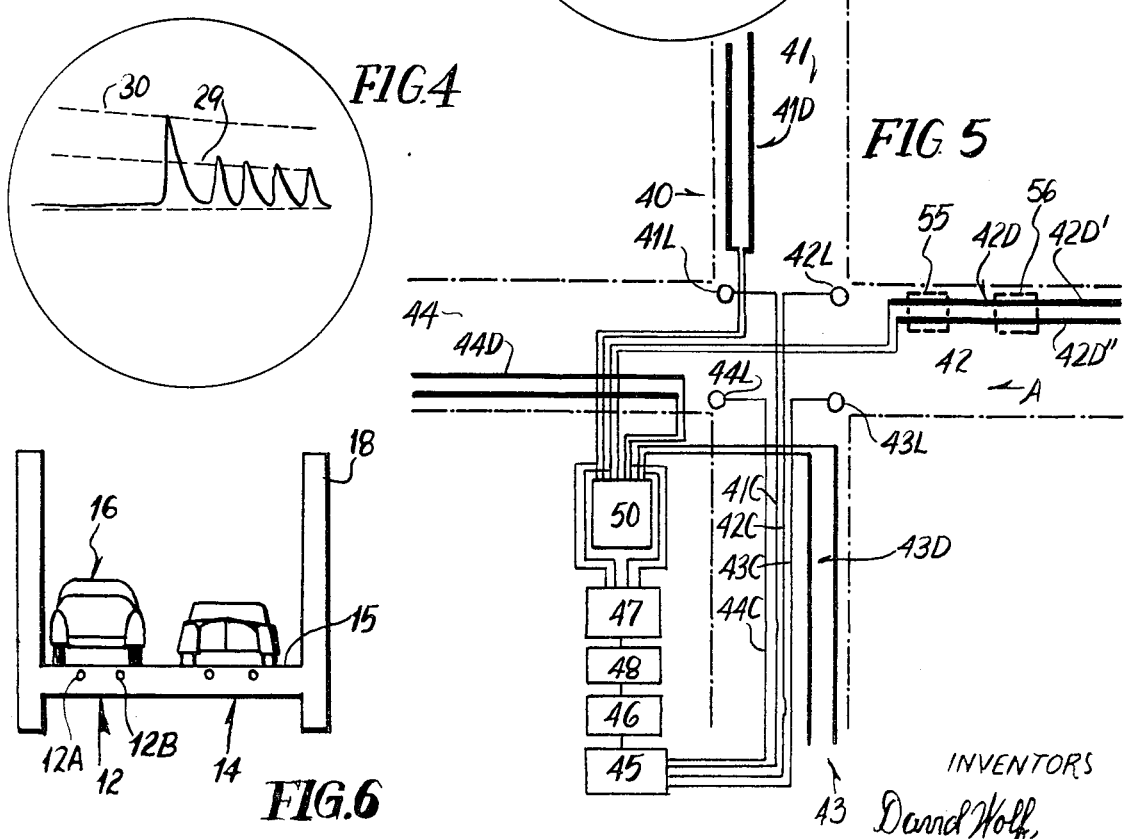

MONITORING SYSTEM

SUBJECT MATTER OF THE INVENTION

The present invention relates to a monitor and in particular to a monitor designed for highway safety purposes and traffic control.

BACKGROUND OF THE INVENTION

For some time there has been a need to provide an improved means for monitoring movement of automotive traffic. This need is particularly acute in tunnels and on bridges where there are limited entrances and exits where breakdowns should be immediately detected to limit continuing inflowing traffic. Conventionally monitoring has been attained by guards walking along the sides. This technique has serious limitations because some bridges and tunnels have very limited walkways. In addition, tunnels often accumulate sufficient pollution to limit the amount of time that a guard can patrol the tunnel. Finally, walking guards do not spot breakdowns and tieups in sufficient time to maximize corrective measures. There have also been attempts to control such traffic movement by TV monitors and the like. Such monitors are expensive and have limited utility because the limited range of the systems. For example, a camera cannot view an entire system.

SUMMARY OF THE INVENTION

The present invention provides an improved highway monitoring system which does not have the limitations of many of the presently existing monitoring systems now in use. In the present invention there is provided means by which the flow of traffic in a tunnel, bridge or on a highway may be constantly monitored. The system also provides a means and method by which the rate of movement of traffic may be precisely calculated and viewed along the entire length of the route being surveyed. Thus, for example, in a tunnel the system provides a means by which specific areas of slowdown or speedup may be viewed with the specific in individual speed of an automobile being identifiable on a display. It is also an object of the present invention to provide a means by which traffic flow in a tunnel or other limited access highway section may be controlled by means of selective traffic light control keyed to movement of the traffic. A further object of the present invention is to provide a means and method by which traffic signals may be controlled depending upon the amount of traffic flow and other variant traffic conditions.

A further object of the present invention is to provide an improved means and method of monitoring traffic in which monitoring may be effected by passive lines suitably extending along the highway and operated at relatively low average power. A further object of the present invention is to provide a system for monitoring traffic and controlling traffic signals which system may be easily installed in existing highways with minimum expense. The system is also designed to provide easy repair and maintenance and a self-detecting fail-safe system in which failures of the system may be automatically displayed on a detector.

It is an object of the present invention to provide a monitoring system for highway control in which the system is simple and rugged in design not susceptible to vandalism, easily replacing without significant expense and is readily connected to an overall highway control system. A further object of the present invention is to provide a highway signaling system which is easily adapted to use under a variety of highway conditions for various length highways from a few hundred feet to many miles with remote control stations for monitoring flow of traffic.

In the present invention means are provided for transmitting pulses along a cable extending the length of the highway section being monitored. Means are also provided for receiving reflected pulse signals from impedance mismatches at any position along the cable. Cables are located with respect to the highway so that the presence of automobiles along the highway will affect the characteristic impedance of the cable. Display means are provided for visually and schematically representing the cable and the impedance mismatches as they occur along the cable. In an alternate embodiment of the present invention means are provided for controlling the flow of traffic of vehicles in response to the rate of movement of the characteristic impedance mismatches along the cable.

BRIEF DESCRIPTION OF DRAWINGS

The foregoing objects and advantages of the present invention will be more clearly understood when considered in conjunction with the accompanying drawings in which:

FIG. 1 is a schematic representation of a tunnel, bridge or other elongated route along which traffic flows;

FIG. 2 is a cross-sectional view of the installation as viewed along the line 2—2 of FIG. 1;

FIG. 3 is a schematic representation of a display received when the system is in operation;

FIG. 4 is a detailed enlarged view of a portion of the display of FIG. 3;

FIG. 5 is a schematic illustration of a modification of the invention showing its use in traffic control at an intersection; and FIG. 6 is a still further modification of the installation.

DESCRIPTION OF PREFERRED EMBODIMENTS

The present invention will be described in conjunction with a preferred embodiment for use on bridges or tunnels. It should be understood, however, that there are other applications for the present invention in which a monitoring system for remote locations is desired. Such additional applications might, for example, include industrial or non-highway traffic control.

In the preferred embodiment described in this application the system is particularly adapted for use in tunnels and on bridges in which there is limited ability for an individual to patrol or walk the length of the system being monitored.

Referring first to FIG. 1, there is illustrated schematically a tunnel 1, which may, for example, be an underwater tunnel having ends 2 and 3 opening onto remote land locations. The tunnel may be of any conventional construction and may, for example, comprise a tunnel such as the Tunnel connecting Manhattan and New Jersey or the Callahan Tunnel connecting Boston and South Boston, Massachusetts. The tunnel may provide a plurality of lanes 4 and 5 for traffic moving in the same or opposite directions as the case may be. In such cases, there is ordinarily a wall divider or painted line 6 that defines the two lanes 4 and 5. Extending lengthwise of the tunnel are preferably two sets of cables 7 and 8 with set of cable 7 including cable 7A and cable 7B, with set of cable 8 comprising cable 8A and 8B. Cables 7B and 8B extend lengthwise of the tunnel or the opposite side walls 9 and 10 at a height that may, for example, be approximately three feet from the ground or roadway level 11. These cables are suitably insulated and preferably project the short distance from their respective walls 9 and 10. Suitable support means which may, for example, comprise plastic standards clamped at one end to the cable and bolted or otherwise secured to the walls at the other end. These standards should be provided at sufficient distance to provide a means of uniformly supporting the cables 7B and 8B, preferably at a uniform height above the roadway 11. The other cable of each of the sets of cables also extend lengthwise of the tunnel. These cables 7A and 8A are preferably located adjacent to centerline 6 and may be buried a slight distance below the upper surface of the roadway 11 for purposes of minimizing damage to the cables 7A and 8A by the vehicular traffic passing over them. Thus, for example, cables 7A and 8A suitably insulated from the surrounding material may be buried under a dielectric material such as tar a few inches below the roadway level. The ends of the cables 7A, 7B, 8A and 8B are preferably terminated at one corresponding end in a mismatched impedance. This may, for example, be obtained by terminating cables 7B, 8B at open ends 7C and 8C. Cable 7A and cable 8A may be suitably grounded. The cables should be conventionally weatherproof cables capable of withstanding normal exposure for prolonged periods of time. Each cable comprises preferably a conductive line of uniform dimension. Each set of cables provides a set of uniform characteristic impedance, preferably in the order of the three hundred to one thousand ohms. The distance between cables 7A and 7B in set 7 and 8A and 8B in set 8 should also be uniform along the entire length. This distance should be such as to require vehicles traveling in the lane associated with the set of cables to affect the characteristic impedance of the cable at the particular point of the vehicle. This distance, in part, determines the characteristic impedance of each set of cables. The uniform distance between cables 7A and 7B may, for example, be in the order of 10 feet. Similarly, the distance between cables 8A and 8B should be uniformly about the same distance with this distance uniform along the entire length. The diameters of the cables should be determined by known techniques to insure a characteristic impedance of magnitude set forth. The distance between the cables may be less than 10 feet so that cables of smaller diameter may be used. Thus, for example, as illustrated in the embodiment of FIG. 6, sets of cables 12 and 14 may be provided with the cables 12A and 12B of set 12, both buried beneath the roadway 15 with the distance between cables 12A and 12B being in the order of magnitude of a fraction to several feet. The spacing of cables 12A and 12B are so located as to assure that presence of traffic above the cables as illustrated, for example, by the vehicle 16 will affect the characteristic impedance between the conductor of cables 12A and 12B. Preferably, in this connection the set of cables 12 would be centrally located in the left lane as viewed in FIG. 6.

A pulse generating circuit 20 within the station 21 is electrically sequentially connected to each of the cable sets 7 and 8. This pulse generating circuit may be of conventional design and capable of pulsing each cable set. The pulse which the circuit 20 must be capable of generating may vary depending upon the specific applications involved. However, it is preferable that pulses be of low average power but of high peak power having a rectangular shape and an amplitude of several thousand volts with a duration of in the order of 100 to 500 nanoseconds and with a pulse repetition frequency of up to several hundreds or thousands of cycles per second. The low limits of the cycle are determined by the attenuation factor of the cable. If necessary, suitable amplification may be provided to minimize attenuation. The minimum repetition frequency is determined by the persistence of vision and brightness factor of the CRT display described below. A suitable pulse generator of the type required has been made by Tobe Deutschmann Laboratories of Canton, Massachusetts, and is sold under the trademark "TELEMETROSCOPE". Other suitable pulse generating circuits are commonly available and may be readily adapted for pulsing with the frequency and power described above. If desired, several pulse generating circuits may be used to pulse the cables instead of a circuit for sequentially scanning the cables from the same pulse generating circuit as described above.

One end of each of the cable sets is impedance matched to terminals of the pulse generating circuits. The other ends of the cable sets are preferably terminated by an impedance mismatch. An open-circuit mismatch is preferred. Such an open circuit mismatch will provide a deflection on the CRT display tube in a manner which represents the end of the monitored highway section and thus permits easy calibration of the CRT display to the actual length of the highway section being monitored and further permits an easy determination of whether or not the entire highway section is properly being monitored.

If necessary, several sets of cables may be arranged in series along a length of roadway with the sets separately connected to a common pulse for sequential firing and display. In such an arrangement amplification of the section exposed for influence by automotive travel is selective.

The station 21 may be conventionally located at the end of the highway, bridge or tunnel section. It may, for example, comprise a toll booth, control station or dispatchers headquarters. If desired, the station 21 may consist of a remote station with suitable connections hereafter described from the remote central station that controls several bridges, tunnels or highway networks.

Also connected to the sets of cables 7 and 8 is a receiver 24 having a visual CRT display 25 upon which reflected signals from the sets of cables 7 and 8 are displayed. In the arrangement described two signals may be displayed in an A-scope presentation best illustrated in FIG. 3. A conventional oscilloscope display may be used in which an input signal is suitably amplified by the receiver by usual means and displayed on the scope. Preferably, the amplifier in the receiver has a time dependent gain control to compensate for normal attenuation of remote signals. These displays correspond to and are appropriately labeled for each of cable sets 7 and 8 by the numerals 7D and 8D. The time scale for these displays may be calibrated in distance for two-way travel time. Thus, for example, if the cables extend a distance of two miles, each of the lines from one end 26 to the other end 27 are calibrated to indicate a distance of two miles by scale 28 taking into consideration the velocity of propagation of the particular cables and insulating medium involved. Scale 28 may also be calibrated and marked to indicate the amplitude of the reflected signal. The Y scale need be scaled only to indicate whether the reflected pulse signal is large or small. This may be accomplished by calculating on the calibration of the CRT display an average characteristic impedance mismatch for a conventional passage of automobile. Such a characteristic impedance mismatch would ordinarily be indicated by deflections to the line 29. Characteristic impedance mismatches caused by larger vehicles, such as trailer trucks, show deflections that might extend to the calibration line 30. The differential characteristic impedance mismatches is best illustrated in FIG. 4 which represents a large scale display of a typical section of the cable being monitored. Such differences in characteristic impedance deflections are useful by operators in determining what type of equipment should be dispatched to assist in breakdowns or traffic stoppages. For example, a large trailer truck creating a stoppage in one or two lanes of a tunnel would require different type of emergency equipment than would a small passenger vehicle blocking a single lane of a tunnel.

Referring now to FIG. 5, there is illustrated a further embodiment of the invention which is particularly adapted for monitor control of traffic lights. In the embodiment illustrated there is shown a four-street intersection 40 including streets 41, 42, 43 and 44. Each of these streets is controlled by corresponding traffic lights 41L, 42L, 43L and 44L connected conventionally by cables 41C, 42C, 43C, and 44C to a sequencer or light controller 45. This sequencer or controller 45 operates in a conventional fashion to change the lights 41L, 42L, 43L and 44L if proper red, green and/or yellow sequence. In ordinary installations the sequencer 45 is controlled by preset means although there have in some instances been installations in which the sequence of 45 is controlled by a computer which, in turn, receives data input from a variety of sources. In the present invention the computer control 46 provides input information for sequentially controlling the traffic lights through the sequencer 45. Data input in the present invention to the computer is received from the receiver 47 through an analog digital converter 48. The receiver 47 receives, amplifies and transmits analog information in the form of reflected pulses from each of the cable sets 41D, 42D, 43D and 44D. These cable sets 41D, 42D, 43D and 44D are each elongated pairs of cables that are similar in construction and configuration. Typical is the cable set 42D. This set, for example, comprises a pair of conductive cables 42D' and 42''. The cables are preferably secured in space relation to each other at a distance such that vehicular traffic passing down the roadway 42 toward the intersection in the direction of arrow A affect the characteristic impedance of these cables at any given point. The cables 42A' and 42D'' may be of any suitable length but should be of sufficient length so as to permit a computer calculation of the nature of traffic flowing along roadway 42. Thus, for example, the length of the cables 42D' and 42D'' may extend a distance of 500 feet if the intersection is one in which traffic travels at moderate to high speeds. At intersections in which the traffic ordinarily travels at slow speeds, as, for example, at an intown location, the length of the cables may be shorter as, for example, 200 feet. The cables are spaced apart the distance so that vehicular traffic passing in the direction of arrow A will affect the characteristic impedance of the cable set 42D. Cables may, for example, be buried an inch or two beneath the roadway or, alternately, may be supported overhead. A more precise evaluation of vehicular traffic may be obtained if the cables are supported in an air dielectric. However, in many instances such installations are impractical because of a variety of reasons and therefore as a compromise the cables must be buried just below the roadway surface. As previously described, the characteristic impedance of the cable sets are determined by the diameter of the cable, the dielectric media, and the spacing apart. A suitable characteristic impedance in the order of 300 to 500 ohms is preferred although greater or lesser characteristic impedances may be used. In the system described cable 42D' is grounded. If desired, a balanced line 42D'' may be used in which neither the cables 42D' and 42D'' are grounded. In some instances, the two cables 42D' and 42D'' may be eliminated and replaced by a single cable in which the roadway functions as a ground although in this latter instance more precise evaluations may be obtained by using a double cable system.

Each of the cable sets 41D, 42D, 43D and 44D are connected to the pulse generator 50 which electrically, sequentially is connected to the cable sets for sequentially firing. This circuit may be of similar design to the circuits previously described provided it is capable of pulsing each cable in rapid sequence. The pulses generated down the cable sets may be of low average power but of high peak power having a rectangular shape, an amplitude of several thousand volts with a duration of in the order of 1,000 to 500 nanoseconds and with a pulse repetition frequency of up to several hundred or thousand cycles per second. The low limits of the voltage are determined by the attenuation factors of the cable. If desired, separate pulse generating circuits may be used for each of the cables instead of a circuit for sequentially scanning the cables from the same pulse generating circuit as described above. One end of each of the cable sets is impedance matched to terminals of the pulse generating circuit 50. The other end of each cable is preferably terminated by an impedance mismatch. An open circuit mismatch is preferred. They may, however, be terminated in an impedance match if desired for a particular application.

In the operation of this system, vehicular traffic traveling down each of the roadways 41, 42, 43 and 44 affect the characteristic impedance of the cable sets 41D, 42D, 43D and 44D, respectively. In the case, for example, or roadway 42, the movements of vehicles 55 and 56 over the cable sets 42D' and 42D'' cause reflections of the pulses being emitted from the pulse generator. These reflections are received by the receiver 47. The receiver 47 in turn amplifies them and transmits them to the analog digital converter 48 which in turn feeds the information received from each of the roadways to the computer 46. The computer in turn evaluates the information received in terms of speed and of volume of the moving vehicles from each of the roadways and thereby in a prescribed conventional fashion determines the sequence of traffic light control and feeds this command information to the sequencer 45. It is apparent that reflection of pulses received from cable set 42D in comparative short intervals means that the traffic on roadway 42 is heavy and the vehicles are closely spaced. The relative movement of the reflected pulses along the cable of 42D determines the speed at which vehicular traffic is moving, which may also be utilized by the computer 46 for proper control of the sequential lighting of the lights.

While the foregoing invention has been described in connection with a balanced line system in which one of the lines or cables is grounded, it should be understood that the invention also contemplates embodiments in which a single line is utilized with the line related to the ground effect of the ambient area. In addition, the systems previously described utilizing two cables also contemplate in addition to an arrangement wherein one of the cables is grounded an arrangement in which a balanced line system is used. In this system neither cable is grounded. The material discussed from page 11, line 23, to page 12, line 13, inclusive, applies to the embodiment of FIG. 1.

What is claimed is:

1. A traffic monitoring system comprising elongated conductive means in a dielectric medium having a substantially uniform characteristic impedance, said conductive means extending lengthwise of and in proximity to the path of travel of at least one vehicle whereby the presence of said vehicle causes a mismatch of the characteristic impedance in a portion of said conductive means in proximity thereto and the movement of said vehicle causes said mismatch to move correspondingly along said conductive means, pulsing means for generating electrical pulses along said conductive means, and receiving means for receiving pulse reflections from impedance mismatches along said conductive means and display means for displaying a representation of said conductive means and impedance mismatches occurring therealong.

2. A traffic monitoring system as set forth in claim 1, including
   a roadway upon which a series of said vehicles travel, means securing said conductive means lengthwise of said roadway, and said display means, including a visual display wherein mismatches are displayed as pulses.

3. A traffic monitoring system as set forth in claim 1 for a series of said vehicles wherein said conductive means includes a pair of conductive cables spaced apart and extending lengthwise of said roadway, means supporting said cables in positions whereby the characteristic impedance thereof is at least in part determined by the spacing of said cables and is affected by movement of vehicles in proximity thereto.

4. A traffic monitoring system as set forth in claim 3 wherein at least one of said cables is supported above the roadway surface.

5. A system as set forth in claim 1, including a plurality of intersecting paths of travel with an elongated conductive means for each path of travel, a traffic signal means for said paths of travel and means responsive to said display means for controlling said traffic signal means.

6. A traffic monitoring system as set forth in claim 3 wherein said pulsing means includes means for generating pulses in the order of 100 to 500 nanoseconds.

7. A traffic monitoring system as set forth in claim 6 wherein said display means includes amplifier means having time dependent gain control for compensation of attenuation of remote signals.

* * * * *